US011656365B2

(12) United States Patent
Price et al.

(10) Patent No.: US 11,656,365 B2
(45) Date of Patent: May 23, 2023

(54) GEOLOCATION WITH AERIAL AND SATELLITE PHOTOGRAPHY

(71) Applicant: Microsoft Technology Licensing, LLC, Redmond, WA (US)

(72) Inventors: Raymond Kirk Price, Redmond, WA (US); Michael Bleyer, Seattle, WA (US); Evan Gregory Levine, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/895,979

(22) Filed: Jun. 8, 2020

(65) Prior Publication Data

US 2021/0383144 A1    Dec. 9, 2021

(51) Int. Cl.
*G06F 16/909* (2019.01)
*G01S 19/48* (2010.01)
(Continued)

(52) U.S. Cl.
CPC .......... *G01S 19/396* (2019.08); *G01S 19/485* (2020.05); *G06F 16/909* (2019.01); *G06V 10/40* (2022.01);
(Continued)

(58) Field of Classification Search
CPC ... G06T 7/33; G06T 2207/30181; G01S 5/00; G01S 5/16; G01S 5/163; G01S 5/166;
(Continued)

(56) References Cited

U.S. PATENT DOCUMENTS 8,049,658 B1 * 11/2011 Lagonik ................ G01S 13/867
                                                            342/146
8,229,163 B2 *  7/2012 Coleman ................ G06V 20/13
                                                            382/103
(Continued)

FOREIGN PATENT DOCUMENTS

EP          3133413 A2 *  2/2017  ............. F41G 7/346
EP          3133413 A2     2/2017
KR       20190123459 A    11/2019

OTHER PUBLICATIONS

Hamidi ("Precise 3D Geo-Location of UAV Images Using Geo-Referenced Data"; Pub. 2015; pp. 269-275; URL: https://pdfs.semanticscholar.org/4714/233ac9d5151d5a527673a1e549335b77bb93.pdf).—Provided in IDS (Year: 2015).*

(Continued)

*Primary Examiner* — Peet Dhillon
(74) *Attorney, Agent, or Firm* — Alleman Hall Creasman & Tuttle LLP

(57) ABSTRACT

A method of automatically geolocating a visual target. The method comprises operating a flying vehicle in a search region including the visual target. The method further includes affirmatively identifying a visual target in an aerial photograph of the search region captured by the flying vehicle. The method further includes automatically correlating the aerial photograph of the search region to a geo-tagged photograph of the search region, wherein the geo-tagged photograph is labelled with pre-defined geospatial coordinates. Based on such automatic correlation, a geospatial coordinate is determined for the visual target in the search region.

18 Claims, 3 Drawing Sheets

(51) Int. Cl.
  *G01S 19/39* (2010.01)
  *G06V 20/13* (2022.01)
  *G06V 20/20* (2022.01)
  *G06V 10/764* (2022.01)
  *G06V 10/774* (2022.01)
  *G06V 10/82* (2022.01)
  *G06V 10/44* (2022.01)
  *G06V 10/40* (2022.01)
  *G06V 20/17* (2022.01)
  *G06V 20/10* (2022.01)

(52) U.S. Cl.
  CPC .......... *G06V 10/454* (2022.01); *G06V 10/764* (2022.01); *G06V 10/774* (2022.01); *G06V 10/82* (2022.01); *G06V 20/13* (2022.01); *G06V 20/17* (2022.01); *G06V 20/20* (2022.01); *G06V 20/194* (2022.01)

(58) Field of Classification Search
  CPC ...... G01S 7/046; G01S 13/723; G01S 13/867; G01C 1/00; G01C 19/00; G01C 21/005
  See application file for complete search history.

(56) References Cited

U.S. PATENT DOCUMENTS

| | | | | |
|---|---|---|---|---|
| 8,983,682 | B1* | 3/2015 | Peeters | G16H 40/20 |
| | | | | 701/2 |
| 10,515,458 | B1* | 12/2019 | Yakimenko | G06T 7/66 |
| 2014/0279096 | A1* | 9/2014 | Akin | G06F 16/5854 |
| | | | | 705/16 |
| 2017/0206648 | A1* | 7/2017 | Marra | G01C 11/00 |
| 2019/0205610 | A1* | 7/2019 | Muehlfeld | G06V 20/188 |
| 2019/0354741 | A1* | 11/2019 | Yang | G06V 30/194 |
| 2019/0392211 | A1* | 12/2019 | Hartman | H04N 5/33 |

OTHER PUBLICATIONS

Hamidi, et al., "Precise 3D Geo-Location of UAV Images Using Geo-Referenced Data", In International Archives of the Photogrammetry, Remote Sensing & Spatial Information Sciences, vol. XL-1/W5, Nov. 23, 2015, pp. 269-275.

"International Search Report & Written Opinion Issued in PCT Application No. PCT/US2021/023693", dated Jul. 19, 2021, 15 Pages.

* cited by examiner

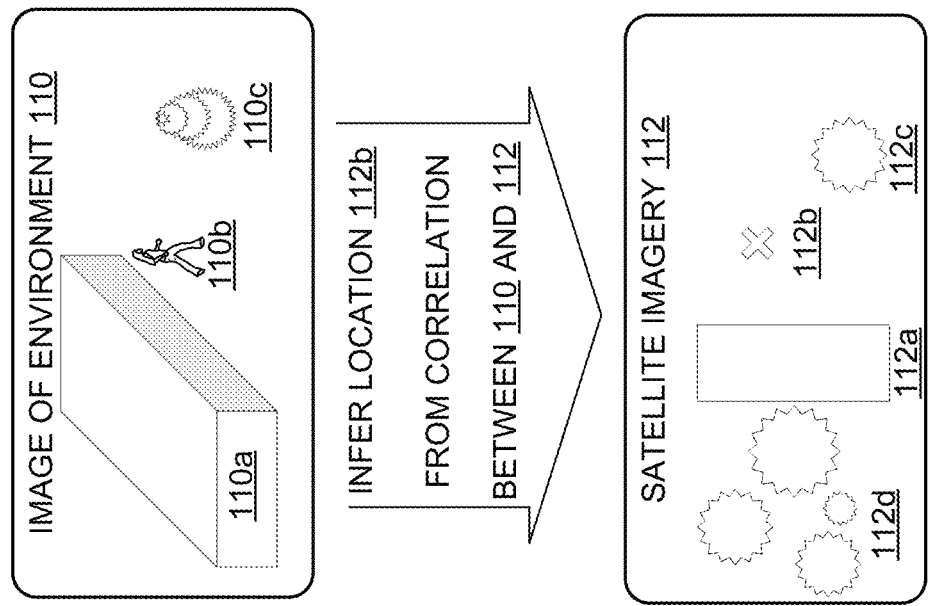
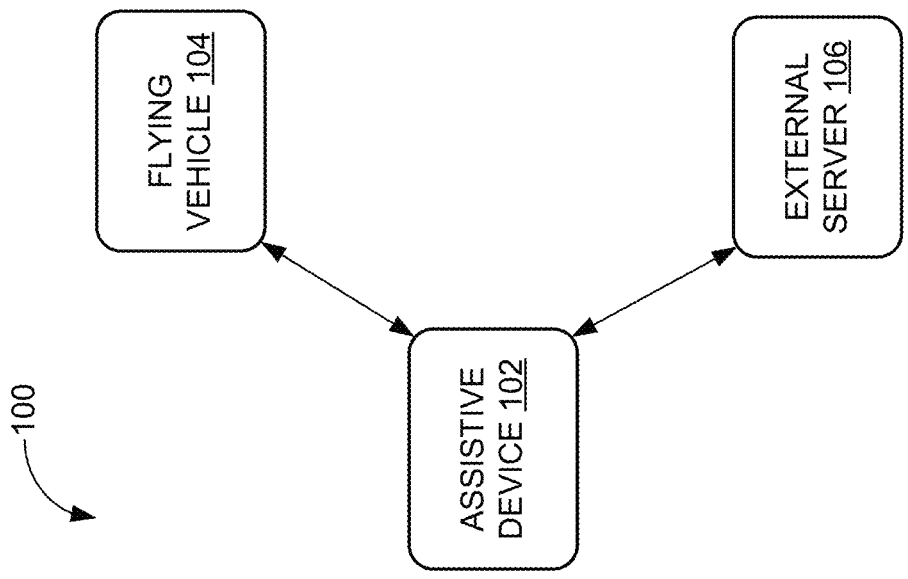

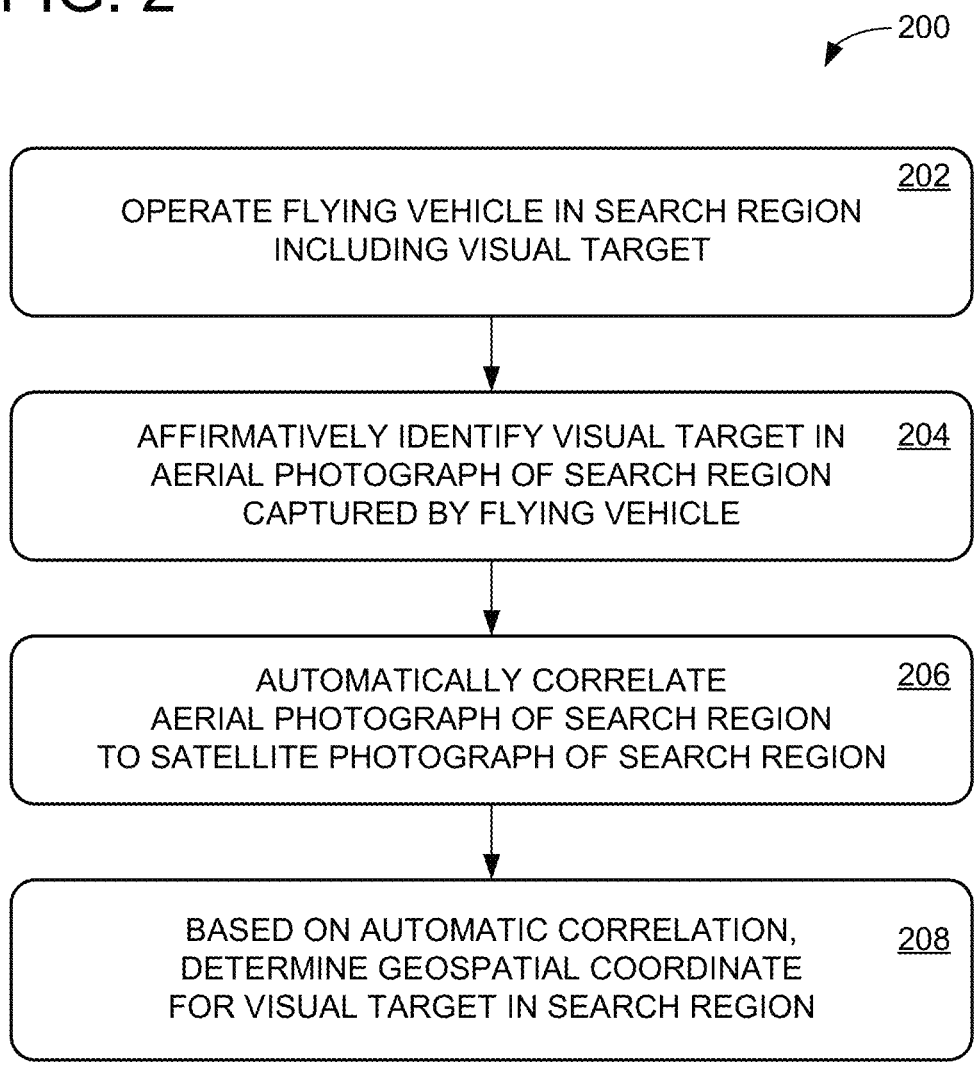

GEOLOCATION WITH AERIAL AND SATELLITE PHOTOGRAPHY

BACKGROUND

Portable computing devices may use global positioning system (GPS) technology to determine a geolocation (e.g., of a user or of a nearby landmark). However, in some examples, reliable GPS information may be unavailable. For example, GPS information may be incomplete and/or erroneous due to compromised communication with one or more GPS satellite signals, or as a result of spoofing or jamming.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method is disclosed of automatically geolocating a visual target, including operating a flying vehicle in a search region including a visual target. The method further includes affirmatively identifying a visual target in an aerial photograph of the search region captured by the flying vehicle. The method further includes automatically correlating the aerial photograph of the search region to a geo-tagged photograph of the search region, wherein the geo-tagged photograph is labelled with pre-defined geospatial coordinates. Based on such automatic correlation, a geospatial coordinate is determined for the visual target in the search region.

BRIEF DESCRIPTION OF THE DRAWINGS

FIG. 1A shows a geolocation system.

FIG. 1B shows exemplary aerial and satellite photography.

FIG. 2 shows a method of automatically geolocating a visual target.

DETAILED DESCRIPTION

Figure 3:
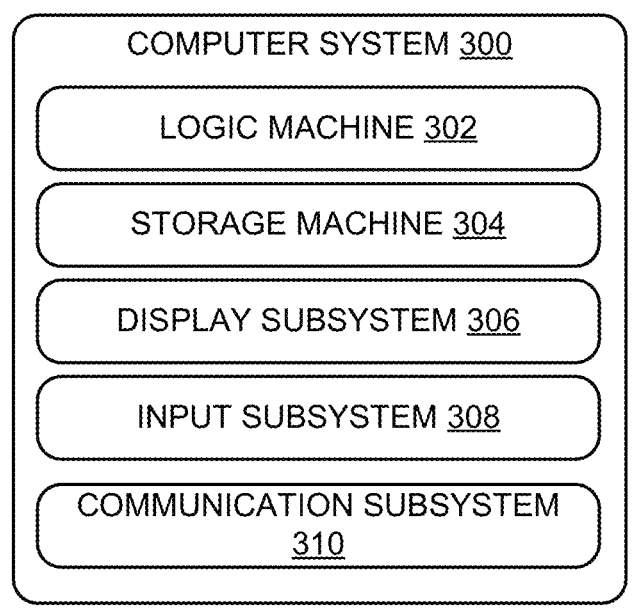
FIG. 3 shows an exemplary computing system.

Geolocation services may enable humans to make more informed decisions, for example regarding navigation. "Geolocation" may be used herein to describe any relevant information pertaining to a spatial location on Earth (e.g., as latitude/longitude coordinates, as an address, and/or any other suitable indicator of a location). For example, a computer device configured to provide geolocation services may enable a user of the computer device to more efficiently navigate to an address, landmark, natural feature or other destination/location. For example, a user's current geolocation and the geolocation of a planned destination may be used to automatically determine navigational information (e.g., direction and/or distance, and/or navigational steps from the current geolocation to the planned destination).

Global positioning system (GPS) devices are frequently employed to provide geolocation services. GPS devices interpret a plurality of signals from GPS satellites, in order to triangulate a real-world location based on the transmission latencies of the GPS signals. When a GPS device is able to receive sufficient, accurate GPS signals from a plurality of GPS satellites, it may be able to accurately determine a geolocation of the GPS device.

However, in some examples, reliable GPS signals may be not be available. For example, the GPS device may be unable to receive signal from some or all of the satellites (e.g., due to a satellite failing to broadcast GPS signal, and/or due to environmental attenuation of broadcast signals, such as occlusion by steep rocky terrain, buildings, etc.). As another example, the GPS device may receive spurious signals. For example, in some cases the GPS signal bandwidth may include unauthorized signals and/or noise, decreasing signal-to-noise ratio for true GPS signals. In some examples, a malicious party may broadcast fake GPS signals in the GPS signal bandwidth. In general, falsified GPS signals may or may not be detectable. In some examples, a falsified GPS signal may correspond to a location which can be determined to be inaccurate (e.g., the falsified GPS signal may correspond to a location that is miles away from user's location). However, in some examples a malicious party may broadcast GPS signals that result in undetectable, yet significant errors to GPS determination of geolocation. For example, the malicious party may broadcast a falsified GPS signal that is gradually altered over time (e.g., skewing a reported clock time in the falsified signal gradually over time). Such malicious techniques may result in accumulated errors to an apparent GPS-determined geolocation, while not presenting any obvious evidence of falsification upon initial reception of the falsified GPS signal.

Accordingly, the present disclosure is directed to a geolocation technique that may be used when GPS signals may be unavailable and/or unreliable. Using the methodology of the present disclosure, visual imagery of a target location (e.g., photographs) is correlated to geo-tagged imagery (e.g., geo-tagged satellite photographs or any other geo-tagged photographs) that is labeled with geospatial coordinates (e.g., labeled photographs, with geospatial coordinates associated with X-Y pixel coordinates of the photographs). Based on such correlation, a geolocation of the target location is determined (e.g., geospatial coordinates of the target location may be determined based on X-Y coordinates of pixels in the correlated photos). The geolocation techniques of the present disclosure may be used to verify GPS-determined geolocation and/or to correct deficiencies in GPS-determined geolocation. For example, the techniques of the present disclosure may allow a user to obtain an accurate geolocation (e.g., of the user and/or of a nearby landmark), even when GPS signals are unavailable and/or compromised by a malicious party. The terms "imagery" and "photography" may be used interchangeably herein to describe any suitable representation of visible features in a real-world environment. As a non-limiting example, photography may be captured using an optical system, e.g., based on exposure of a sensor medium to light reflected off of the features in the real-world environment.

FIG. 1A shows a geolocation system 100. Geolocation system 100 includes an assistive device 102, which in typical examples is a portable device carried by or along with a human user. As a non-limiting example, assistive device 102 may be a head-mounted device worn by a human user. As further non-limiting examples, assistive device 102 may be a mobile handheld device (e.g., a smartphone), a laptop device, an automated assistant speaker interface device (e.g., a smart speaker), or a vehicle multimedia interface device (e.g., a car heads-up display).

In some examples, assistive device 102 is configured to determine geospatial coordinates (e.g., of the user and/or of a nearby object, person, or landmark) and to present determined geospatial coordinates to the user. As a non-limiting example, the determined geospatial coordinates may be visually presented via a display (e.g., via a head-mounted display of a head-mounted device). In some examples, instead of or in addition to visual presentation, the determined geolocation may be presented via text, presented via audio (e.g., via a headset of the assistive device 102), presented via a virtual reality and/or augmented reality interface, and/or presented in any other suitable fashion (e.g., as an interactive and/or non-interactive map, as part of a series of navigation directions, as a geospatial coordinate, and/or as an address). In other examples, the methodology of the present disclosure may be utilized to locate a visual target (e.g., a user) even when the visual target is not carrying an assistive device 102. As a non-limiting example, the above-described steps of determining geospatial coordinates and visually presenting geospatial coordinates may be carried out at remotely at a computer device associated with a support team of a user, in order to locate the user and report the determined location to the support team.

According to the techniques of the present disclosure, assistive device 102 or any other computer device may be configured to determine the geolocation via one or more means including correlation of photography of a surrounding environment (e.g., aerial photography or any other suitable photography) to geo-tagged photography (e.g., satellite imagery, and/or other pre-recorded aerial imagery). The present example includes numerous examples of geolocation using correlation of aerial photography to satellite photography. However, the techniques described herein may be implemented by comparing any other photography of the surrounding environment to geo-tagged photography labelled with a geo-referenced position (e.g., pre-recorded satellite imagery labelled with geospatial coordinates). In general, as will be described further below with regard to method 200, a target is affirmatively identified in photography of the environment (e.g., in aerial photography). The target may be identified by human evaluation and/or automatically identified by machine learning. As described herein, identification of the target in the environment photography may include determining a location of the target in the environment photography (e.g., an X-Y pixel coordinate in an aerial photograph). Accordingly, visual features of the environment photography may be correlated to a geo-tagged photograph (e.g., satellite photograph) and the location of the target in the photograph may be correlated to a geospatial coordinate based on the labels of the geo-tagged photograph.

Assistive device 102 may optionally also be configured to measure the geolocation via GPS. Accordingly, assistive device 102 may optionally include a GPS configured to estimate a geolocation via received GPS signals. As described above, geolocation estimated via the GPS may or may not be accurate. Therefore, assistive device 102 is configured to optionally corroborate received GPS signals with geolocation determined via correlation of environmental imagery (e.g., aerial photography) to satellite (or other pre-recorded and/or geo-tagged) photography.

Turning briefly to FIG. 1B, FIG. 1B includes an exemplary image of an environment 110, for example an aerial photograph of an environment including a building 110a, a human 110b, and a tree 110c. For example, human 110b may be a human user of an assistive device 102 using the assistive device 102 to request geospatial coordinates of their current location. FIG. 1B further includes an exemplary satellite photograph 112 showing an overhead satellite view of the building 112a, overhead view of the tree 112c, and an overhead view of additional trees 112d on the other side of the building. Using the methods of the present disclosure, the aerial photograph of the environment 110 may be correlated to the satellite photograph 112 to determine a location 112b corresponding to the human 110b. Based on the determined location 112b in the satellite photography, a geospatial coordinate of the user 110b may be determined and returned to the assistive device. Furthermore, using the methods of the present disclosure, the assistive device may additionally or alternately obtain locations for the tree 112c or building 112a, for example.

Returning to FIG. 1A, as described above, assistive device 102 is configured to determine a geospatial coordinate in the nearby environment using photography of the nearby environment (e.g., one or more aerial photograph(s)) and geo-tagged (e.g., satellite) photography labeled with geospatial coordinates. The geo-tagged photography may be labeled in any suitable fashion. For example, a satellite photo may be labeled with one or more coordinates associated with specific pixels (e.g., a coordinate associated with a corner or center of the image). Alternately or additionally, specific pixel locations in an image may have an associated label (e.g., indicating a geospatial coordinate, address, or landmark). The geospatial coordinate may be for any suitable location on the labeled, geo-tagged photography. For example, a geospatial coordinate may be obtained for a position on the labeled map that corresponds to a current position of a human user of assistive device 102, a nearby human in the environment, a nearby object, a landmark, a vegetation feature, or any other visually-identifiable feature in the environment . . . . For example, human user(s) of assistive device 102 may request geolocation services to obtain a geospatial coordinate of themselves. Alternately or additionally, a human user may request geospatial coordinates of another nearby human, of a building, structure, or any other man-made object, or of a geographic landmark. Alternately or additionally, a different human (e.g., a member of a support team associated with the human user) may request geolocation service of the human user on the human user's behalf.

In some examples, assistive device 102 may be configured to process one or more photograph(s) of the nearby environment and one or more satellite photograph(s) labeled with geospatial coordinates, in order to determine the geospatial coordinate of the visual target, for example by calculating an image correlation between the photographs using one or more on-board processor(s) and/or storage device(s). Accordingly, in some examples, the labelled satellite photograph(s) may be pre-loaded to assistive device 102 for use in such processing. For example, assistive device 102 may be pre-configured with global and/or regional satellite data with geospatial labels at any suitable resolution. For example, assistive device 102 may be configured to download a regional satellite image database including a plurality of satellite photographs and pre-defined geospatial coordinates, so that photography of the nearby environment may be correlated against one or more of the plurality of satellite photographs (e.g., using any suitable image search algorithm, machine learning, image homography, random sample consensus (RANSAC), and/or any other suitable method as will be described further below with regard to method 200).

Alternately or additionally, assistive device 102 may be configured to co-operate with one or more external devices to obtain and/or process the photography. Accordingly, assistive device 102 optionally includes a communication subsystem configured to communicate with one or more other devices to obtain and/or process photography of the nearby environment and/or labelled satellite photography. Assistive device 102 may communicatively couple to other devices via any suitable communication technology (e.g., via Bluetooth, near-field communication, wireless mesh network, radio, wireless and/or wired local-area network connection). In some examples, assistive device 102 may communicate with an external server 106. External server 106 may be any suitable computing device, e.g., a cloud computing server or an edge computing server. Edge computing may be used herein to refer to any device configured to supply assistive device 102 with networking, processing, storage, and/or other functionality, for example via a radio connection, wireless mesh network, local area network, etc.

In some examples, assistive device 102 may be configured to obtain photography of the nearby environment with an on-board camera (e.g., a camera of an HMD device or mobile device, or a vehicular camera in an assistive system of an automobile).

Alternately or additionally, assistive device 102 may communicatively couple to a different device configured to obtain photography of the nearby environment with a camera. For example, assistive device 102 may communicate with a flying vehicle 104 including a camera, wherein flying vehicle 104 is configured to fly above a visual target to obtain an aerial picture of the visual target, and communicate the aerial picture of the visual target back to assistive device 102. Assistive device 102 may communicatively couple to the flying vehicle 104 via a radio connection or any other suitable connection. In some examples, assistive device 102 may communicatively couple to the flying vehicle 104 via an intermediate server (e.g., assistive device 102 and flying vehicle 104 may exchange messages via an external server 106).

As a non-limiting example, flying vehicle 104 may be a human-portable flying vehicle that may be deployed by a human user of assistive device 102. Alternately or additionally, flying vehicle 104 may be a remote-controlled flying vehicle that may communicatively couple to assistive device 102 in order to enable the user to pilot the remote-controlled flying vehicle to obtain a suitable photograph. Alternately or additionally, flying vehicle 104 may be piloted at least in part via commands issued by another human user (e.g., a remote pilot in a support team associate with the human user). In other examples, flying vehicle 104 may be not be human-portable and/or flying vehicle 104 may not be deployed or piloted by the human user of assistive device 102. Instead, flying vehicle 104 may be an autonomous, remotely piloted, and/or human-piloted flying vehicle deployed from any suitable location. For example, flying vehicle 104 may be a helicopter, plane, quadcopter, or any other state-of-the-art and/or future flying craft.

In general, the flying vehicle may be configured to deploy to an aerial region substantially above the ground target in order to capture a suitable aerial photograph. For example, flying vehicle 104 may be a human-portable, autonomous flying vehicle configured to ascend to a suitable altitude to take a plan-view photograph of a nearby environment of the human user, then to descend and return to the human user. The aerial region substantially above the target may be at any location suitable for obtaining a photograph that is substantially in plan view so that a visual target in the environment may be identified without obstruction. In some examples, perspective distortion to the image may be at most a predefined threshold, e.g., at most 30 degrees, at most 15 degrees, at most 5 degrees or at most 2 degrees, for example relative to a photo taken from immediately above the visual target and/or a photo taken at a substantial difference (e.g., a satellite photo).

Flying vehicle 104 may be configured to capture any suitable aerial photography that may be correlated against geo-labelled satellite photography. For example, flying vehicle 104 may be configured to capture near-infrared photographs, suitable for assessing near-infrared features for comparison to near-infrared features present in near-infrared satellite photography. Alternately or additionally, flying vehicle 104 may be configured to capture color photography (e.g., for correlation to color satellite photography). Alternately or additionally, flying vehicle 104 may be configured to capture hyperspectral photographs based on light in any two or more spectral bands (e.g., visible light and near-infrared, and/or any other spectral bands). Accordingly, such hyperspectral photographs may be correlated against corresponding hyperspectral features in satellite photography.

The above-described methodology may be applied using any suitable computer device(s) and/or environmental photography, e.g., using compute capabilities of a suitable assistive device and aerial photography captured by a flying vehicle. Accordingly, FIG. 2 shows a method 200 of automatically geolocating a visual target. At 202, method 200 includes operating a flying vehicle in a search region including a visual target.

At 204, method 200 includes affirmatively identifying a visual target in an aerial photograph of the search region captured by the flying vehicle. In some examples, identifying the visual target in the aerial photograph may be based on computer-identification using visual features in the photograph. For example, the visual target may be automatically computer-identified using machine learning (e.g., using a convolutional neural network or any other suitable algorithm). In other examples, the visual target may be identified by a human. For example, the visual target may be identified by a human user of an assistive device or by a member of a support team of the human user (e.g., by pointing at a location in an image captured by the flying vehicle). In general, the affirmative identification of the visual target in the aerial photograph may include determining a location of the visual target in the aerial photograph (e.g., as an X-Y pixel coordinate in the aerial photograph). For example, a machine learning system may be trained for object detection and/or object location, thereby permitting the machine learning system to affirmatively identify a visual target in a photograph, including determining a location of the visual target in the photograph. Alternately or additionally, as described above, a human user may affirmatively identify the visual target in the aerial photography by pointing at an aerial photograph, thereby indicating a determined location of the visual target in the aerial photograph.

At 206, method 200 includes automatically correlating the aerial photograph of the search region to a geo-tagged photograph of the search region. As a non-limiting example, the geo-tagged photograph may be a satellite photograph. The satellite photograph is labelled with pre-defined geo-spatial coordinates which may be determined in advance and stored along with the satellite photograph—e.g., latitude/longitude values. The satellite photograph and/or labels may be stored on the assistive device (e.g., whether the assistive device is a head-mounted device, mobile device, or any other device), stored on the flying vehicle, and/or stored on an external server. For example, the labels may be stored as part of the satellite photograph (e.g., encoded in an image file format used to store the satellite photograph) and/or stored separately from the satellite photograph (e.g., stored in a separate database, wherein the separate database is maintained on the same storage device as the satellite photograph or on a different storage device). Accordingly, the automatic correlation may be performed on any suitable device. For example, some or all of the automatic correlation may be offloaded to an external server, in order to return results to the assistive device. As a non-limiting example, automatically correlating the aerial photograph of the search region to the satellite photograph of the search region may include 1) communicating the aerial image to a remote server, 2) computing the automatic correlation at the remote server, and 3) returning the computed automatic correlation to the assistive device. In other examples, automatically correlating the aerial photograph of the search region to the satellite photograph of the search region includes 1) communicating the aerial image to the assistive device and 2) computing the automatic correlation at the assistive device.

Regarding transmission of aerial photography, it may be transmitted (e.g., between the flying vehicle, assistive device, and/or external server) in the form of raw images, tonemapped images (e.g. 8 bit per pixel data), compressed images (e.g. JPEG compressed), and/or high-level image features (e.g., compressed images and/or neural network features derived from images). Transmitting high-level image features may permit correlation of a photograph of the environment against satellite photography with a reduced network bandwidth for transmission of the environment and/or satellite photography.

In some examples, automatically correlating the aerial photograph of the search region to the satellite photograph of the search region includes automatically computer-assessing a homography between the aerial photograph and the satellite photograph. In some examples, the homography may be established via random sample consensus (RANSAC) or via any other suitable statistical and/or machine learning algorithm. For example, RANSAC may be able to align geographic landmarks based on image features. Furthermore, RANSAC may be robust against partial occlusion such as clouds and/or vegetation cover, so that a visual target in an aerial image may be correlated against a satellite image even when partially occluded in one or more of the aerial image and the satellite image. In some examples, computer-assessing the homography is based on comparing a set of derived image features of the aerial photograph having a smaller dimensionality than the aerial photograph, to a corresponding set of derived image features of the satellite photograph having a smaller dimensionality than the satellite photograph. For example, a dimensionality of a raw image may depend on a resolution and color depth of the image, e.g., one dimension for each pixel in the image having values depending on the color depth of the image. Accordingly, the computer-assessed homography may be based on compressed image features, features assessed by a neural network, frequency domain features (e.g., wavelet or FFT features in the spatial frequency domain), and/or any other suitably reduced set of features having a smaller dimensionality than the full pixel resolution of the image.

At 208, method 200 includes, based on the above-described automatic correlation, determining a geospatial coordinate for the visual target in the search region. For example, the RANSAC homography computation may be configured to match the aerial photograph to the satellite photograph and to use a scale and displacement in the matching of the photographs to determine a coordinate of a pixel location in the aerial photography.

In some examples, the above-described methodology may be used to correct errors in a GPS system. For example, when the assistive device includes a GPS, the determined geospatial coordinate may be compared to a measured location assessed by the GPS system, for example to assess accuracy of the measured location assessed by the GPS system. For example, an error in the measured location assessed by the GPS system may be detected based on a disparity between (1) the geospatial coordinate determined via the described image correlation and (2) the measured location assessed by the GPS system. In some examples, an assistive device may be configured to primarily utilize GPS for geolocation, while periodically checking the GPS-determined coordinates against a determined geospatial coordinate from photography of the environment. For example, aerial photography may be used to periodically determine that GPS measurements remain accurate and uncompromised. Furthermore, geospatial coordinates determined from photography of the environment may be used to assess a corrective model for the measured location assessed by the GPS system based on the disparity. For example, if GPS signals in an area are compromised (e.g., falsified signals with GPS clock skew), the aerial photography may be used to develop a corrective clock model that accounts for skew in some or all of the compromised signals, thereby improving an accuracy of GPS measurements despite the compromised GPS signals. In some examples, geospatial coordinates determined from photography may be supplied, along with measured GPS coordinates, to a machine learning model configured to learn a correlation between the geospatial coordinates determined from photography and the measured GPS coordinates. For example, based on such correlation, the machine learning model may be operated to predict whether measured GPS coordinates may be inaccurate (e.g., due to spoofing) and/or to correct inaccurate GPS coordinates by predicting likely geospatial coordinates based on the model.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 3 schematically shows a non-limiting embodiment of a computing system 300 that can enact one or more of the methods and processes described above. Computing system 300 is shown in simplified form. Computing system 300 may take the form of one or more personal computers, server computers, tablet computers, home-entertainment computers, network computing devices, gaming devices, mobile computing devices, mobile communication devices (e.g., smart phone), and/or other computing devices. For example, computing system 300 may be an assistive device 102.

Computing system 300 includes a logic machine 302 and a storage machine 304. Computing system 300 may optionally include a display subsystem 306, input subsystem 308, communication subsystem 310, and/or other components not shown in FIG. 3.

Logic machine 302 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 304 includes one or more physical devices configured to hold instructions executable by the logic machine to implement the methods and processes described herein. When such methods and processes are implemented, the state of storage machine 304 may be transformed—e.g., to hold different data.

Storage machine 304 may include removable and/or built-in devices. Storage machine 304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 304 may include volatile, nonvolatile, dynamic, static, read/write, read-only, random-access, sequential-access, location-addressable, file-addressable, and/or content-addressable devices.

It will be appreciated that storage machine 304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 302 and storage machine 304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 implemented to perform a particular function. In some cases, a module, program, or engine may be instantiated via logic machine 302 executing instructions held by storage machine 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

The techniques of the present disclosure may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 306 may be used to present a visual representation of data held by storage machine 304. This visual representation may take the form of a graphical user interface (GUI). As the herein described methods and processes change the data held by the storage machine, and thus transform the state of the storage machine, the state of display subsystem 306 may likewise be transformed to visually represent changes in the underlying data. Display subsystem 306 may include one or more display devices utilizing virtually any type of technology. Such display devices may be combined with logic machine 302 and/or storage machine 304 in a shared enclosure, or such display devices may be peripheral display devices.

When included, input subsystem 308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 310 may be configured to communicatively couple computing system 300 with one or more other computing devices. Communication subsystem 310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 300 to send and/or receive messages to and/or from other devices via a network such as the Internet.

In an example, a method of automatically geolocating a visual target comprises: operating a flying vehicle in a search region including a visual target; affirmatively identifying the visual target in an aerial photograph of the search region captured by the flying vehicle; automatically correlating the aerial photograph of the search region to a geo-tagged photograph of the search region, wherein the geo-tagged photograph is labelled with pre-defined geospatial coordinates; and based on such automatic correlation, determining a geospatial coordinate for the visual target in the search region. In this or any other example, the geo-tagged photograph of the search region is a satellite photograph of the search region. In this or any other example, the visual target is a human user electronically requesting geolocation. In this or any other example, the human user carries an assistive device configured to present the determined geospatial coordinate. In this or any other example, the assistive device is a head-mounted device worn by the human user. In this or any other example, the assistive device includes a global positioning (GPS) system, and wherein the method further comprises comparing the determined geospatial coordinate to a measured location assessed by the GPS system. In this or any other example, the method further comprises detecting an error in the measured location assessed by the GPS system based on a disparity between the determined geospatial coordinate and the measured location assessed by the GPS system. In this or any other example, the method further comprises assessing a corrective model for the measured location assessed by the GPS system based on the disparity. In this or any other example, automatically correlating the aerial photograph of the search region to the geo-tagged photograph of the search region includes communicating the aerial image to a remote server, computing the automatic correlation at the remote server, and returning the computed automatic correlation to the assistive device. In this or any other example, automatically correlating the aerial photograph of the search region to the geo-tagged photograph of the search region includes communicating the aerial image to the assistive device and computing the automatic correlation at the assistive device. In this or any other example, the assistive device is configured to download a regional image database including the geo-tagged photograph and pre-defined geospatial coordinates. In this or any other example, the flying vehicle is a human-portable device deployed by the human user. In this or any other example, the visual target is a geographic landmark. In this or any other example, the visual target is a building, structure, or other man-made object. In this or any other example, the flying vehicle is an autonomous flying vehicle configured to automatically deploy to an aerial region substantially above the visual target for capturing the aerial photograph. In this or any other example, the flying vehicle is configured to capture near-infrared photographs and wherein the aerial photograph and the geo-tagged photograph include near-infrared features. In this or any other example, automatically correlating the aerial photograph of the search region to the geo-tagged photograph of the search region includes automatically computer-assessing a homography between the aerial photograph and the geo-tagged photograph. In this or any other example, computer-assessing the homography is based on a set of derived image features of the aerial photograph having a smaller dimensionality than the aerial photograph, to a corresponding set of derived image features of the geo-tagged photograph having a smaller dimensionality than the geo-tagged photograph.

In an example, a head-mounted device comprises: a global positioning system (GPS); a display; a logic device; and a storage device holding instructions executable by the processor to: receive an aerial photograph of a search region including a visual target, the aerial photograph captured by a flying vehicle operating in the search region; automatically correlate the aerial photograph of the search region to a satellite photograph of the search region, wherein the satellite photograph is labelled with pre-defined geospatial coordinates; based on such automatic correlation, determine a geospatial coordinate for the visual target in the search region; and detect an error in a measured location assessed by the GPS system based on a disparity between the determined geospatial coordinate and the measured location assessed by the GPS system.

In an example, a computer system comprises: a logic device; and a storage device holding instructions executable by the logic device to: receive an aerial photograph of a search region including a visual target, the aerial photograph captured by a flying vehicle operating in the search region; automatically correlate the aerial photograph of the search region to a satellite photograph of the search region, wherein the satellite photograph is labelled with pre-defined geospatial coordinates; and based on such automatic correlation, determine a geospatial coordinate for the visual target in the search region.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of automatically geolocating a visual target, comprising:
affirmatively identifying a visual target in an aerial photograph of a search region, the visual target having a global positioning system (GPS) device;
automatically correlating the aerial photograph of the search region to a geo-tagged photograph of the search region, wherein the geo-tagged photograph is labelled with pre-defined geospatial coordinates;
based on such automatic correlation, determining a geospatial coordinate for the visual target in the search region;
receiving a measured location assessed by the GPS device;
detecting an error in the measured location assessed by the GPS device based on a disparity between the determined geospatial coordinate and the measured location assessed by the GPS device; and
assessing a corrective model for the measured location assessed by the GPS device based on the disparity.

2. The method of claim 1, wherein the geo-tagged photograph of the search region is a satellite photograph of the search region.

3. The method of claim 1, wherein the visual target is a human user that carries the GPS device.

4. The method of claim 3, wherein the GPS device is included in a head-mounted device worn by the human user.

5. The method of claim 1, wherein automatically correlating the aerial photograph of the search region to the geo-tagged photograph of the search region includes communicating the aerial photograph to a remote server, computing the automatic correlation at the remote server, and returning the computed automatic correlation to an assistive device associated with the GPS device.

6. The method of claim 1, wherein automatically correlating the aerial photograph of the search region to the geo-tagged photograph of the search region includes communicating the aerial photograph to an assistive device and computing the automatic correlation at the assistive device.

7. The method of claim 6, wherein the assistive device is configured to download a regional image database including the geo-tagged photograph and pre-defined geospatial coordinates.

8. The method of claim 1, wherein the aerial photograph of the search region is captured by a camera on a flying human-portable device deployed by a human user.

9. The method of claim 1, wherein the aerial photograph of the search region is captured by a camera on an autonomous flying vehicle configured to automatically deploy to an aerial region substantially above the visual target for capturing the aerial photograph.

10. The method of claim 1, wherein the aerial photograph of the search region is captured by a camera on a flying vehicle, and wherein the flying vehicle is configured to capture near-infrared photographs and wherein the aerial photograph and the geo-tagged photograph include near-infrared features.

11. The method of claim 1, wherein automatically correlating the aerial photograph of the search region to the geo-tagged photograph of the search region includes automatically computer-assessing a homography between the aerial photograph and the geo-tagged photograph.

12. The method of claim 11, wherein computer-assessing the homography is based on comparing a set of derived image features of the aerial photograph having a smaller dimensionality than the aerial photograph, to a corresponding set of derived image features of the geo-tagged photograph having a smaller dimensionality than the geo-tagged photograph.

13. A method of automatically geolocating a visual target, comprising:
affirmatively identifying a visual target in an aerial photograph of a search region captured by a flying vehicle operating in the search region, the visual target having an assistive device including a global positioning system (GPS) device;
automatically correlating the aerial photograph of the search region to a geo-tagged photograph of the search region, wherein the geo-tagged photograph is labelled with pre-defined geospatial coordinates;
based on such automatic correlation, determining a geospatial coordinate for the visual target in the search region;
receiving from the assistive device a measured location assessed by the GPS device;
detecting an error in the measured location assessed by the GPS device based on a disparity between the determined geospatial coordinate and the measured location assessed by the GPS device; and
assessing a corrective model for the measured location assessed by the GPS device based on the disparity.

14. The method of claim 13, further comprising:
applying the corrective model to the measured location assessed by the GPS device to generate a corrected measured location that corrects the detected error.

15. The method of claim 14, further comprising:
sending the corrected measured location to the assistive device.

16. The method of claim 13, wherein the corrective model is a corrective clock model that accounts for clock skew in compromised GPS signals of the GPS device that cause the error in the measured location assessed by the GPS device.

17. The method of claim 13, wherein the corrective model is a machine learning model configured to correct the detected error based on a learned correlation between the determined geospatial coordinate and the measured location assessed by the GPS device.

18. A method of automatically geolocating a visual target, comprising:
affirmatively identifying a visual target in an aerial photograph of a search region captured by a flying vehicle operating in the search region, the visual target having an assistive device including a global positioning system (GPS) device;
automatically correlating the aerial photograph of the search region to a geo-tagged photograph of the search region, wherein the geo-tagged photograph is labelled with pre-defined geospatial coordinates;
based on such automatic correlation, determining a geospatial coordinate for the visual target in the search region;
receiving from the assistive device a measured location assessed by the GPS device;
detecting an error in the measured location assessed by the GPS device based on a disparity between the determined geospatial coordinate and the measured location assessed by the GPS device;
assessing a corrective model for the measured location assessed by the GPS device based on the disparity; and applying the corrective model to the measured location assessed by the GPS device to generate a corrected measured location that corrects the detected error.

\* \* \* \* \*